US009164262B2

(12) United States Patent
Chen et al.

(10) Patent No.: US 9,164,262 B2
(45) Date of Patent: Oct. 20, 2015

(54) INFRARED-CUT FILTER WITH SAPPHIRE SUBSTRATE AND LENS MODULE INCLUDING THE INFRARED-CUT FILTER

(71) Applicants: Ga-Lane Chen, Santa Clara, CA (US); Chung-Pei Wang, New Taipei (TW); Chao-Tsang Wei, New Taipei (TW)

(72) Inventors: Ga-Lane Chen, Santa Clara, CA (US); Chung-Pei Wang, New Taipei (TW); Chao-Tsang Wei, New Taipei (TW)

(73) Assignee: HON HAI PRECSION INDUSTRY CO., LTD., New Taipei (TW)

( * ) Notice: Subject to any disclaimer, the term of this patent is extended or adjusted under 35 U.S.C. 154(b) by 251 days.

(21) Appl. No.: 13/720,916

(22) Filed: Dec. 19, 2012

(65) Prior Publication Data

US 2013/0314772 A1 Nov. 28, 2013

(30) Foreign Application Priority Data

May 28, 2012 (TW) .................................. 101118892

(51) Int. Cl.
| | | |
|---|---|---|
| *G02B 5/08* | (2006.01) | |
| *G02B 5/28* | (2006.01) | |
| *G02B 13/14* | (2006.01) | |
| *G02B 1/11* | (2015.01) | |
| *G02B 5/20* | (2006.01) | |

(52) U.S. Cl.
CPC ................ *G02B 13/143* (2013.01); *G02B 1/11* (2013.01); *G02B 5/282* (2013.01); *G02B 5/208* (2013.01)

(58) Field of Classification Search
CPC ............ G02B 1/00; G02B 1/041; G02B 1/11; G02B 1/111; G02B 1/113; G02B 1/115; G02B 5/00; G02B 5/003; G02B 5/28; G02B 5/281; G02B 5/282; G02B 13/14; G02B 13/143
USPC .................................. 359/350–361, 586–589
See application file for complete search history.

(56) References Cited

U.S. PATENT DOCUMENTS

| | | | | |
|---|---|---|---|---|
| 3,551,017 | A * | 12/1970 | Shimotakahara et al. | 359/359 |
| 4,047,805 | A * | 9/1977 | Sekimura | 359/586 |
| 4,931,315 | A * | 6/1990 | Mellor | 427/167 |
| 7,157,159 | B2 * | 1/2007 | Kondo | 428/699 |
| 7,196,835 | B2 * | 3/2007 | Peumans et al. | 359/245 |
| 7,215,466 | B2 * | 5/2007 | Chen et al. | 359/359 |
| 7,570,428 | B2 * | 8/2009 | Watanabe | 359/586 |
| 2007/0285555 | A1 * | 12/2007 | Chen | 348/340 |
| 2008/0075941 | A1 * | 3/2008 | Tatartchenko et al. | 428/220 |
| 2012/0212809 | A1 * | 8/2012 | Chang et al. | 359/359 |
| 2013/0335625 | A1 * | 12/2013 | Pei | 348/374 |

* cited by examiner

*Primary Examiner* — Thong Nguyen

(74) *Attorney, Agent, or Firm* — Novak Druce Connolly Bove + Quigg LLP

(57) ABSTRACT

An IR-cut filter includes a substrate and an infrared filtering film. The substrate is made of sapphire, and includes a first surface and a second surface opposite to the first surface. The infrared filtering film covers the first surface of the substrate and increases the reflectivity in relation to infrared light, thus filtering out the infrared light. The infrared filtering film includes a number of first high refraction index layers and a number of first low refraction index layers alternately stacked on the first surface of the substrate.

10 Claims, 3 Drawing Sheets

INFRARED-CUT FILTER WITH SAPPHIRE SUBSTRATE AND LENS MODULE INCLUDING THE INFRARED-CUT FILTER

BACKGROUND

1. Technical Field

The present disclosure relates to infrared-cut (IR-cut) filters, and particularly, to an IR-cut filter and a lens module including the IR-cut filter.

2. Description of Related Art

Sapphires have excellent hardness and wear-resistance, and are used in optics and machinery. The sapphire can be used as a cover to protect lenses received in a lens module. However, quality of images captured by the lens module may be affected by infrared light as the sapphire allows the transmission of infrared light.

Therefore, it is desirable to provide an IR-cut filter and a lens module, which can overcome the limitations described.

DETAILED DESCRIPTION

Embodiments of the disclosure will be described with reference to the drawings.

Figure 1:
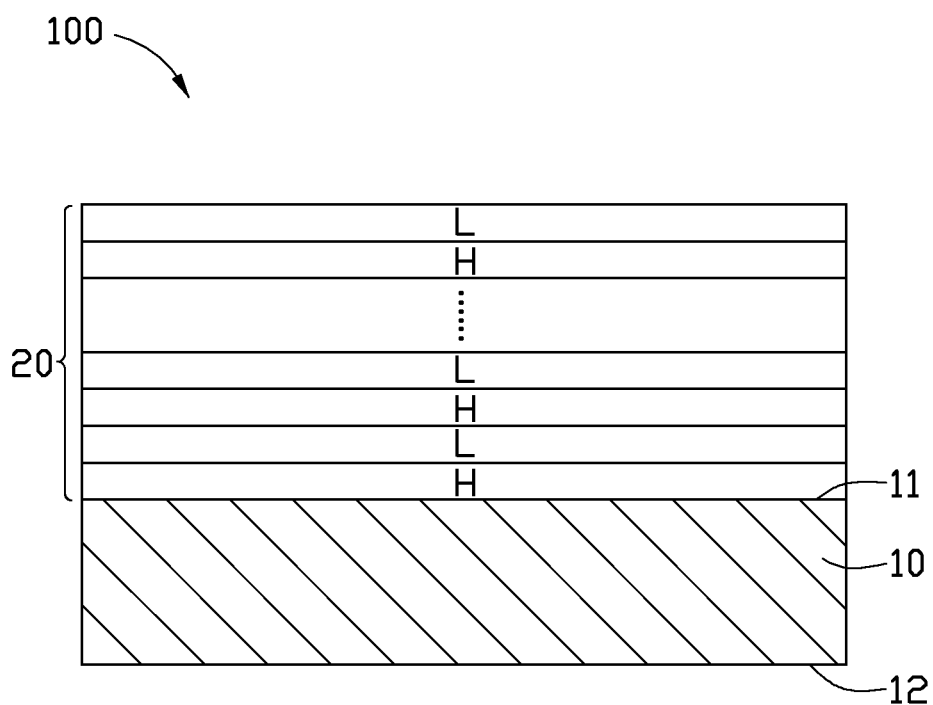
FIG. 1 is a cross-sectional schematic view of an IR-cut filter in accordance with a first exemplary embodiment.

Referring to FIG. 1, an IR-cut filter 100, according to a first exemplary embodiment is shown. The IR-cut filter 100 is configured to filter out (i.e., reject) infrared light while allowing visible light to pass. The IR-cut filter 100 includes a substrate 10 and an infrared filtering film 20 formed on the substrate 10.

The substrate 10 is plate shaped and is made of sapphire. Sapphire is a gemstone variety of the mineral corundum, and has a hexagonal crystal structure. The main chemical component of sapphire is aluminum oxide, and the refraction index of the sapphire is from about 1.747 to about 1.760. The growth direction of the sapphire is a-axis ($11\bar{2}0$), c-axis (0001), m-axis ($10\bar{1}0$). A transmissivity of the substrate 10 at infrared wavelengths, of about 825 nm to about 1300 nm, is greater than 85%. The substrate 10 includes a first surface 11 and a second surface 12 opposite to the first surface 11.

The infrared filtering film 20 increases the reflectivity of the substrate 10 in relation to infrared light, and is coated on the first surface 11 of the substrate 10 by a sputter method or an evaporation deposition method. The infrared filtering film 20 includes a number of first high refraction index layers and a number of first low refraction index layers alternately stacked on the substrate 10.

The film structure of the infrared filtering film 20 is represented by $(xHyL)^\eta$, wherein $\eta$ is a positive integer and in a range that $30 \leq \eta \leq 80$, x meets the formula that $1 < x < 2$, y meets the formula that $1 < y < 2$. H represents the first high refraction index layers of ¼ central wavelength thickness, L represents the first low refraction index layers of ¼ central wavelength thickness. xH represents the first high refraction index layers of x/4 central wavelength thickness, yL represents the first low refraction index layers of y/4 central wavelength thickness, and $\eta$ represents a periodicity of stacking the first low refraction index layer and the first high refraction index layer. In this embodiment, $40 \leq \eta \leq 70$, the central wavelength is a middle value of a wavelength range of transmission lights or filtered lights.

The material of the high refraction index layers is titanium dioxide ($TiO_2$), and the refraction index of the first high refraction index layer is about 2.705. The material of the first low refraction index layers is silicon dioxide ($SiO_2$), and the refraction index of the first low refraction index layers is about 1.499. The materials of the high and first low refraction index layers can be other materials.

The transmissivity of the IR-cut filter 100 at infrared wavelength from about 825 nm to about 1300 nm is lower than about 2%. The infrared lights are filtered after the lights passing through the IR-cut filter 100.

Figure 2:
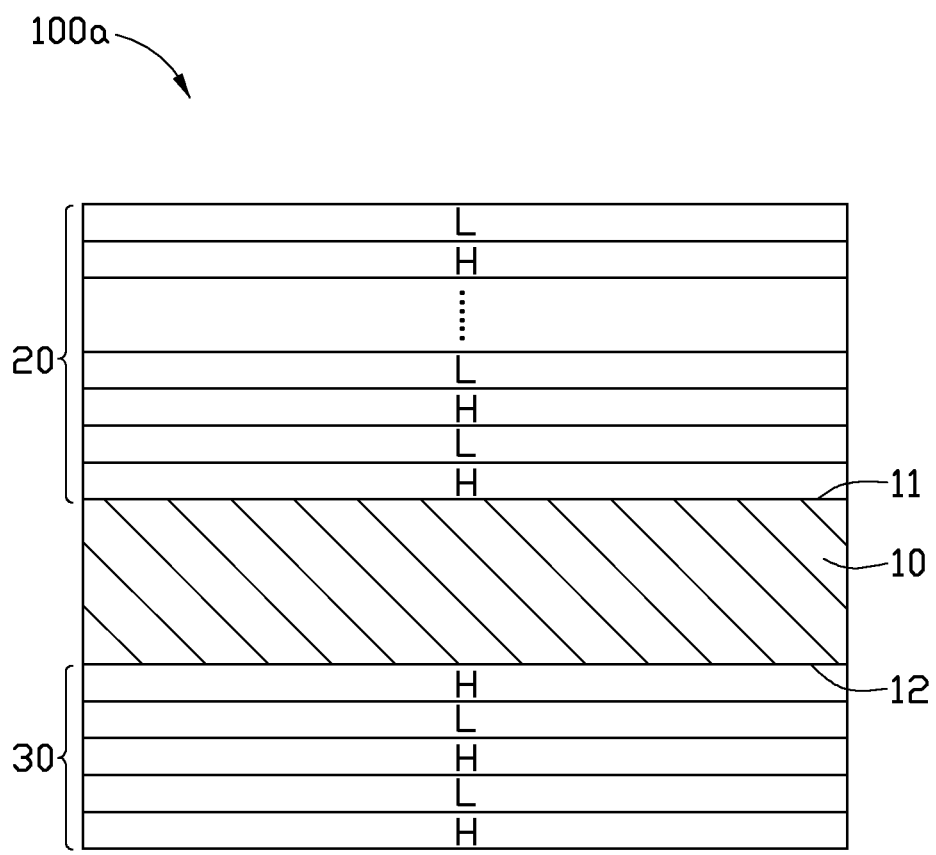
FIG. 2 is a cross-sectional schematic view of an IR-cut filter in accordance with a second exemplary embodiment.

Referring to FIG. 2, an IR-cut filter 100a, according to a second exemplary embodiment is shown. The difference between the IR-cut filter 100a of the second exemplary embodiment and the IR-cut filter 100 of the first exemplary embodiment is that the IR-cut filter 100a further includes an anti-reflection film 30.

The anti-reflection film 30 is configured to increase the transmissivity of the substrate 10 within the visible light spectrum and the reflectivity of the substrate 10 within the infrared light range. The anti-reflection film 30 is coated on the second surface 12 of the substrate 10 by a sputter method or an evaporation deposition method. The anti-reflection film 30 includes a number of second high refraction index layers and a number of second low refraction index layers stacked alternately on the second surface 12 of the substrate 10.

The film structure of the anti-reflection film 30 is represented by $(mHnL)^\delta$, wherein $\delta$ is a positive integer and in a range that $4 \leq \delta \leq 8$, m meets the formula that $1 < m < 2$, n meets the formula that $1 < n < 2$. H represents the second high refraction index layers of ¼ central wavelength thickness, and L represents the second low refraction index layers of ¼ central wavelength thickness. mH represents the second high refraction index layers of m/4 central wavelength thickness, nL represents the second low refraction index layers of n/4 central wavelength thickness, and $\delta$ represents a periodicity of stacking the second low refraction index layers and the second high refraction index layers. In this embodiment, $5 < \eta < 6$, the central wavelength is a middle value of a wavelength range filtered or reflected by the anti-reflection film 30.

The material of the second high refraction index layers is titanium dioxide ($TiO_2$), and the refraction index of the second high refraction index layer is about 2.705. The material of the second low refraction index layers is silicon dioxide ($SiO_2$), and the refraction index of the second low refraction index layers is about 1.499. The materials of both layers may be other materials.

The transmissivity of the IR-cut filter 100a at infrared wavelengths, from about 825 nm to about 1300 nm, is lower than about 1%. The transmissivity of the IR-cut filter 100a at infrared wavelengths from about 390 nm to about 760 nm is greater than about 99%. The infrared is filtered from all the light passing through the IR-cut filter 100a.

Figure 3:
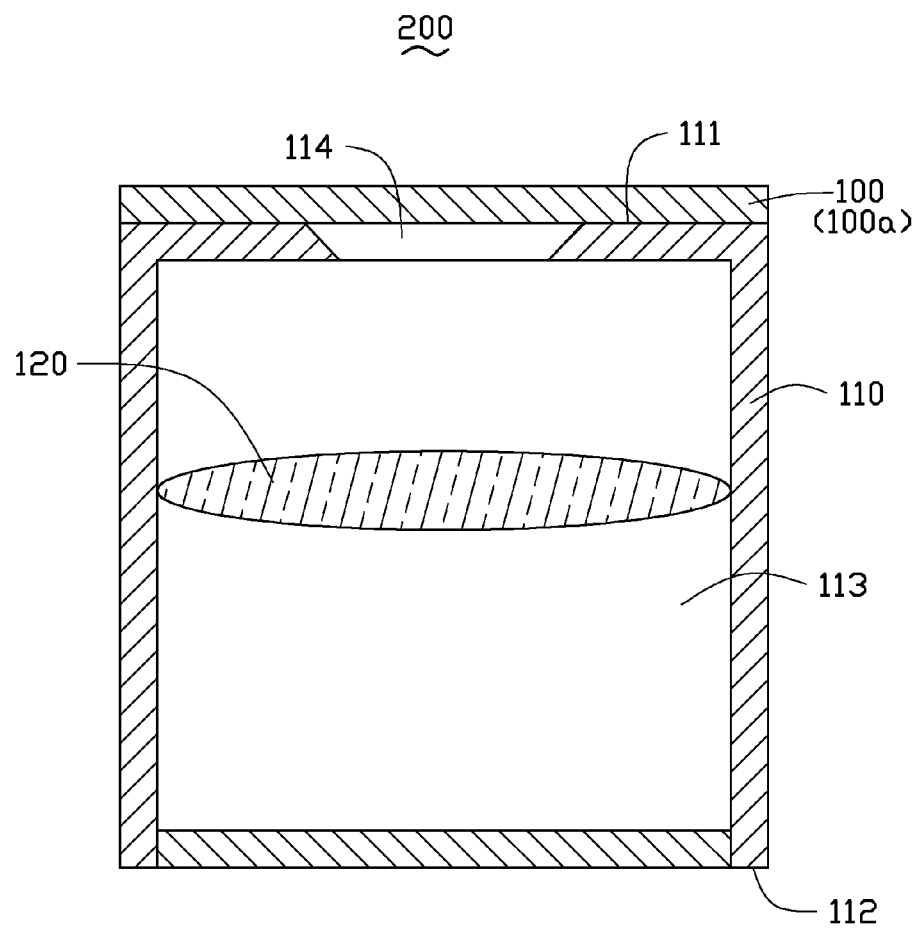
FIG. 3 is a cross-sectional schematic view of a lens module using the IR-cut filter of FIG. 1 or FIG. 2.

Referring to FIG. 3, a lens module 200, according to an exemplary embodiment, includes the IR-cut filter 100 or 100a, a lens barrel 110, and at least one lens 120. The lens barrel 110 includes an object side 111 and an image side 112 opposite to the object side 111. A receiving room 113 is formed between the object side and the image side 112. The lens barrel 110 defines a light entering hole 114 communicating with the receiving room 113 and positioned on the object side 111. The at least one lens 120 is received in the receiving room 113. The IR-cut filter 100 or 100a covers the object side 111, and the light entering hole 114 is sealed by the IR-cut filter 100 or 100a. The IR-cut filter 100 or 100a not only filters the infrared light and allow passage of visible light, but also is a protective shield of the lens module 200.

In other embodiments, the IR-cut filter 100 or 100a can be received in the receiving room 113 or can be positioned on the image side 112 for filtering infrared light.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An IR-cut filter, comprising:
a substrate made of sapphire, a refraction index of the sapphire is from about 1.747 to about 1.760, a growth direction of the sapphire is a-axis (11$\bar{2}$0), c-axis (0001), and m-axis (10$\bar{1}$0), and the substrate comprising a first surface and a second surface opposite to the first surface; and
an infrared filtering film covering on the first surface of the substrate and configured for filtering the infrared lights, the infrared filtering film comprising a number of first high refraction index layers and a number of first low refraction index layers alternately stacked on the first surface of the substrate; wherein the infrared filtering film is represented by $(xHyL)^\eta$, where $\eta$ is a positive integer and in a range that $30 \leq \eta \leq 80$, x meets the formula that $1<x<2$, y meets the formula that $1<y<2$, H represents the first high refraction index layers of ¼ central wavelength thickness, L represents the first low refraction index layers of ¼ central wavelength thickness, xH represents the first high refraction index layers of x/4 central wavelength thickness, yL represents the first low refraction index layers of y/4 central wavelength thickness, and $\eta$ represents a periodicity of stacking the first low refraction index layers and the first high refraction index layers, and wherein the central wavelength is a middle value of a wavelength range of transmission lights or filtered lights.

2. The IR-cut filter of claim 1, wherein $40 \leq \eta \leq 70$.

3. The IR-cut filter of claim 1, wherein a material of the first high refraction index layers is titanium dioxide at a refraction index about 2.705; a material of the first low refraction index layers is silicon dioxide at a refraction index about 1.499.

4. The IR-cut filter of claim 1, further comprising an anti-reflection film covering on the second surface of the substrate, and the anti-reflection film comprising a number of second high refraction index layers and a number of second low refraction index layers alternately stacked on the second surface of the substrate.

5. The IR-cut filter of claim 4, wherein the anti-reflection film is represented by $(mHnL)^\delta$, where $\delta$ is a positive integer and in a range that $4 \leq \delta \leq 8$, m meets the formula that $1<m<2$, n meets the formula that $1<n<2$, mH represents the second high refraction index layers of m/4 central wavelength thickness, nL represents the second low refraction index layers of n/4 central wavelength thickness, and $\delta$ represents a periodicity of stacking the second low refraction index layers and the second high refraction index layers.

6. The IR-cut filter of claim 5, wherein $5 \leq \delta \leq 6$.

7. The IR-cut filter of claim 5, wherein the material of the second high refraction index layers is titanium dioxide at a refraction index about 2.705; the material of the second low refraction index layers is silicon dioxide at a refraction index about 1.499.

8. A lens module, comprising:
a lens barrel comprising an object side and an image side opposite to the object side, the lens barrel defining a receiving room between the object side and the image side, the lens barrel defining a light entering hole communicating with the receiving room and positioned on the object side;
at least one lens received in the receiving room; and
an IR-cut filter covering the light entering hole, the IR-cut filter comprising:
a substrate made of sapphire, a refraction index of the sapphire is from about 1.747 to about 1.760, the growth direction of the sapphire is a-axis (11$\bar{2}$0), c-axis (0001), and m-axis (10$\bar{1}$0), and the substrate comprising a first surface and a second surface opposite to the first surface; and
an infrared filtering film covering on the first surface of the substrate and configured for filtering the infrared lights, the infrared filtering film comprising a number of first high refraction index layers and a number of first low refraction index layers alternately stacked on the first surface of the substrate; wherein the infrared filtering film is represented by $(xHyL)^\eta$, where $\eta$ is a positive integer and in a range that $30 \leq \eta \leq 80$, x meets the formula that $1<x<2$, y meets the formula that $1<y<2$, H represents the first high refraction index layers of ¼ central wavelength thickness, L represents the first low refraction index layers of ¼ central wavelength thickness, xH represents the first high refraction index layers of x/4 central wavelength thickness, yL represents the first low refraction index layers of y/4 central wavelength thickness, and $\eta$ represents a periodicity of stacking the first low refraction index layers and the first high refraction index layers, and wherein the central wavelength is a middle value of a wavelength range of transmission lights or filtered lights.

9. The lens module of claim 8, further comprising an anti-reflection film covering on the second surface of the substrate, and the anti-reflection film comprising a number of second high refraction index layers and a number of second low refraction index layers alternately stacked on the second surface of the substrate.

10. The lens module of claim 9, wherein the anti-reflection film is represented by $(mHnL)^\delta$, where $\delta$ is a positive integer and in a range that $4 \leq \delta \leq 8$, m meets the formula that $1<m<2$, n meets the formula that $1<n<2$, mH represents the second high refraction index layers of m/4 central wavelength thickness, nL represents the second low refraction index layers of n/4 central wavelength thickness, and $\delta$ represents a periodicity of stacking the second low refraction index layers and the second high refraction index layers.

\* \* \* \* \*